Patented Oct. 29, 1929

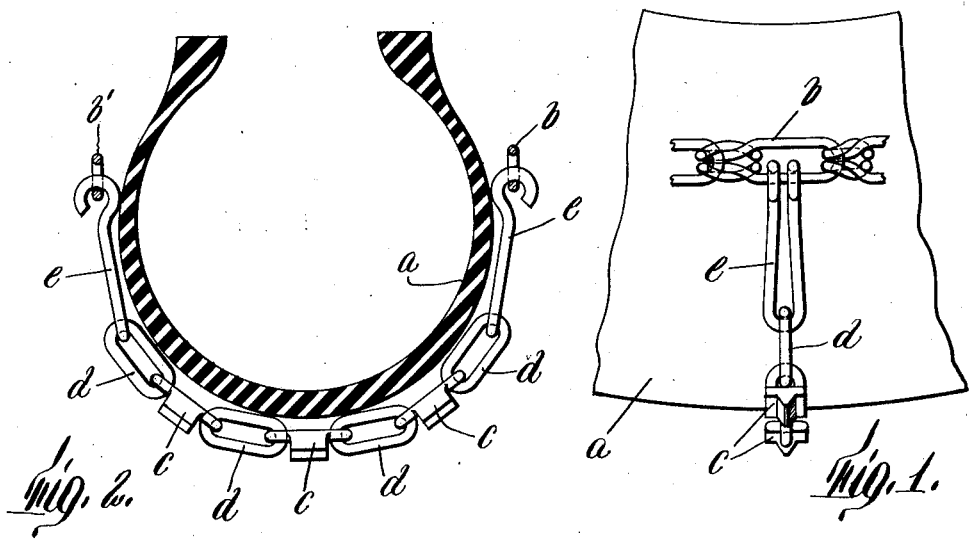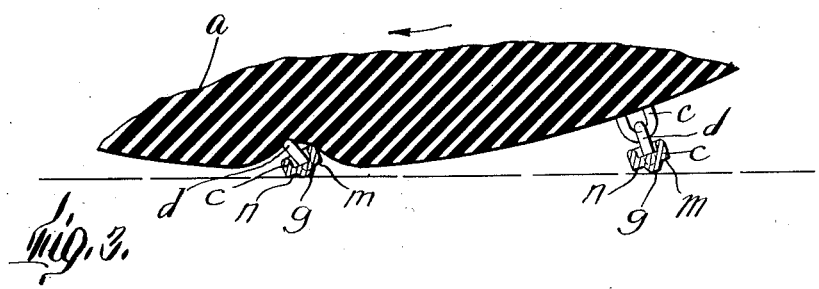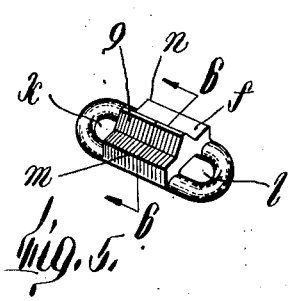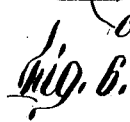

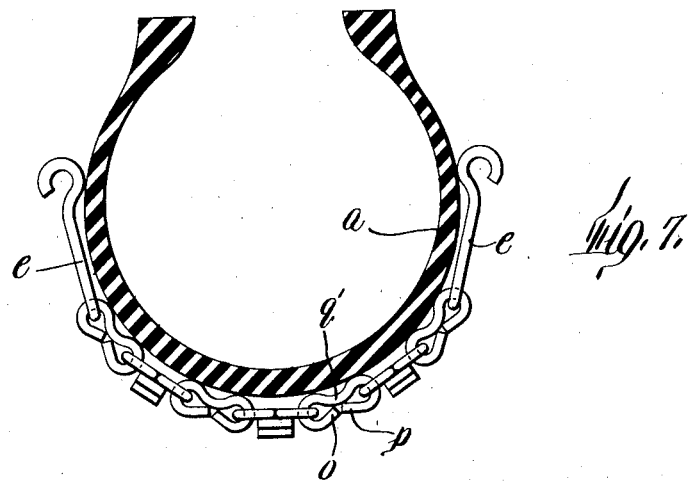
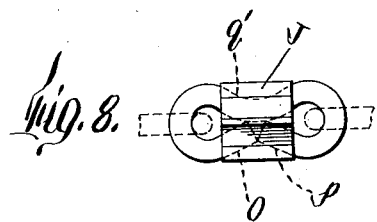
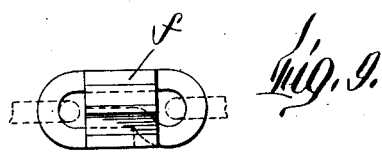
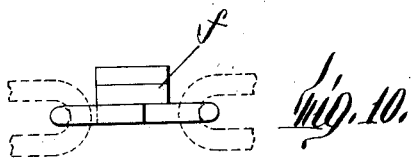
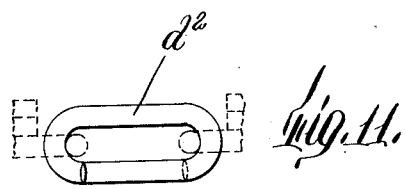
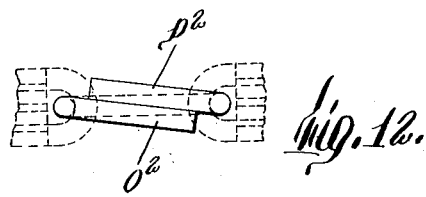

1,733,193

UNITED STATES PATENT OFFICE

PRESTON M. HALL, OF WORCESTER, MASSACHUSETTS, ASSIGNOR TO TAYLOR-HALL WELDING CORPORATION, OF WORCESTER, MASSACHUSETTS, A CORPORATION OF MASSACHUSETTS

ANTISKID CROSS CHAIN FOR VEHICLE WHEELS

Application filed March 31, 1928. Serial No. 266,299.

The present invention embodies an improvement in cross chains and skid preventing links therefor intended and adapted to be applied to vehicle wheels. More particularly such chains are designed for connection to longitudinal side chains to make a link fabric embracing and surrounding the wheel and engaging only the tire thereof, although in its broader aspects the invention may be embodied in cross chains otherwise applied and attached to the wheel. In any case, however, the cross chain extends transversely of the tread of the wheel, that is, crosswise of the path in which the wheel rolls.

The objects of the invention are to increase the power of the chain to resist slipping and skidding of the wheel, to increase the useful life of the chain, to embody in a simple and inexpensive device the means for accomplishing these effects, and by means of these improvements to reduce the cost of the chain as a whole. The invention consists in the new features described in the following specification and shown in the drawings.

Referring to the latter,—

Fig. 1 is a fragmentary side elevation of the tire of an automobile wheel, typifying the wheel as a whole, with a cross chain embodying this invention applied thereto in association with a fragment of one of the longitudinal chains of a link fabric;

Fig. 2 is a cross section of the tire and side chains of the link fabric showing the cross chain in elevation;

Fig. 3 is a fragmentary longitudinal section of the portion of the tire tread adjacent to the ground with two of the cross chains shown in section and represented, one of them as coming in contact with the ground and the other as pressed on by the wheel;

Fig. 4 is a view similar in character to Fig. 3 but showing the action of the cross chain when the wheel tends to slide upon being locked by the brake;

Fig. 5 is a perspective view of one of my skid resisting links;

Fig. 5ª is a perspective view, as seen from the opposite side, of a link of the same character after it has been nearly worn out;

Fig. 6 is a cross section of the skid resisting link taken on line 6—6 of Fig. 5;

Fig. 7 is a view similar to Fig. 2 showing a cross chain embodying minor differences in construction;

Fig. 8 is a plan view of one of the skid resisting links of the chain shown in Fig. 7;

Figs. 9 and 10 are, respectively, a plan view and elevation of another form of skid resisting link;

Figs. 11 and 12 are an elevation and plan, respectively, of a modified form of connecting link.

Like reference characters designate the same parts in all the figures wherever they occur.

The pneumatic tire of an automobile wheel is indicated in a fragmentary way by the reference letter $a$, and may be taken as typifying and representing any sort of a vehicle tire or combined wheel and tire, or wheel, with which antiskid chains may be used. $b$ and $b'$ represent fragments of the two longitudinal chains of the well known link fabrics provided for application to pneumatic tired wheels so as to embrace the tread portion of such tires, this character of link fabric being typified by the well known Weed chains. The side chains or longitudinal chains of such fabrics are connected by cross chains, one of which is shown in these drawings as composed of one or more skid resisting links $c$, $c$, $c$, connecting links $d$, $d$, and end hook links $e$ engaged with the endmost connecting links $d$ and having hooks which couple them to the respectively adjacent side chains. When there is only one of the skid resisting links $c$, it is placed at the middle of the cross chain so as to be at or near the middle line of the tire tread; and when there are more of such links in the cross chain, they are arranged in alternation with the connecting links $d$ and preferably in an odd number, or at any rate in such number and arrangement that one of them is placed at or near the middle of the tread.

The skid resisting links $c$ shown in Figs. 1–6 are preferably made of steel wire, bent into generally oblong form with rounded ends with only sufficient width to contain the ends of adjacent links and permit their free movement, the ends and side members of the wire form (which may be called the "link proper" for convenience of description and to distinguish it from the complete link which consists of the wire base and the aftermentioned plate) lying all in the same plane, and the ends of the wire being abutted and welded together. To the face of the link proper which is designed to face away from the tire when in position for use, is welded a plate $f$ having on its outer side a longitudinal central rib $g$, the sides $h$ and $i$ of which preferably converge more or less sharply in the form of the letter V, and may meet in a sharp edge or intersect an intermediate flat surface $j$, as here shown. The plate has approximately the same width as the link proper, but may be somewhat wider or narrower than the outer dimensions thereof, and is placed against the face of the link proper with its rib extending longitudinally of the latter and welded to both side members of the link by electric spot welding according to known principles and methods, or in any other suitable way. The plate is shorter than the link proper and is placed (preferably midway) between the ends of the latter, leaving eyes $k$ and $l$ exposed at opposite ends of the link to receive the adjacent connecting links.

The composite structure thus composed of a link proper or base link and a ribbed plate in integral welded union with one another forms a unitary article which I call for the purposes of description in this specification a skid resisting link. It may be considered, for the purposes of analytical description, as comprising a body portion and a single eye at each end in such locations that the middle points of the eyes, that is, the points where they are engaged with the adjacent connecting links, are in a line (the central line of the eyes) interminate the side edges of the body portion. The plate $f$ which completes the body portion provides laterally extending webs which terminate in definite edges $m$ and $n$, preferably sharply square originally, at opposite sides of and some distance from the base of the rib $g$. The plate also causes the body portion to have greater thickness than the eyes and to protrude from the plane in which the eyes lie (or, in other word, from the above defined central line of the eyes) while the rib protrudes still further in the same direction. Preferably, although not necessarily, the rib thus protrudes to a distance slightly beyond the outer members of the adjacent connecting links, when new, as shown in Figs. 2 and 10. This protruding solid material lengthens the wearing life, not only of the skid-resisting link itself, but also of the adjacent connecting links, for the brunt of the impact and grinding action on the road surface is borne by the skid-resisting link.

The connecting links are severally made from a piece of steel wire bent in one plane with its ends abutted and welded together to form an oblong link with rounded ends. In the specific cross chain shown in Figs. 1 and 2, there are three skid resisting links each connected at its opposite ends with two connecting links, and there are four connecting links, of which the two outermost are connected with the hook links. But in cases where there is only one of the skid resisting links, the two skid resisting links at each side of the center one are replaced by plain links of the same character as the connecting links $d$. Chains which are longer by virtue of having a greater number of links may have additional plain links only, or both additional skid resisting and plain connecting links at each end.

When such a cross chain is applied to a wheel in the prescribed way and the wheel is rolled over the ground, the chain strikes the ground at a greater or less distance in front of the tangent point of the wheel with the ground. The member of the chain which first strikes the ground is the antiskid link which lies outside of the most protuberant part of the tread face of the tire. In the case of chains applied to ordinary pneumatic tires, it is the one at the middle of the tread; which is the middle link of the cross chain. Contact with the ground of this link occurs ordinarily first on the apex of the rib $g$, although it may possibly occur simultaneously on the rib and the edge $n$, which is then the rear edge (having regard to the direction of travel of the vehicle); but never on the forward edge $m$; the latter edge never comes in contact with the ground except when the wheel is withheld from rolling and slides.

As the advancing wheel commences to roll over the cross chain now lying on the ground, its tread surface engages the upstanding connecting links at each end of the anti-skid link, the upper side portions of which extend above the back of the anti-skid link and bear the brunt of the pressure applied by the wheel. These connecting links, at least the eye portions thereof which engage the anti-skid link, raise or indent the tire more or less and have a rocking contact therewith, while the rib of the anti-skid link has a rocking contact with the ground. After such rib has been somewhat worn away, the lower sides of the connecting links also have a similar contact with the ground. In effect these connecting links provide unstable abutments on which the weight and rearward propelling thrust of the wheel is applied, so that the cross chain is rocked rearwardly and the anti-skid link is placed in an inclined position, substantially as shown in Fig. 3. The anti-skid link remains in this position until the wheel has passed completely over it and the slack in the cross chain has been taken up at the rising rear side of the wheel. Thus the contact of the anti-skid link with the ground and the grinding effect of the road surface thereon is confined to the rib and the rear edge $n$ and the substance between them. Extensive experience has shown that the wearing away of the link in use is confined to the corner $n$ and rib $g$, and the substance between and back of them, forming eventually a substantially flat surface shown in Fig. 5ª, which intersects the opposite side of the rib on a distinct edge $q$, and that the edge $m$ remains intact and sharp as long as the link remains in service except for the wear which results from accidental skidding; while the intersection between the surface formed by wear and the opposite, intact, face of the rib is at all times, and in all stages of the life of the link, a straight sharp edge.

By reason of the protection from wearing given to the edge $m$, this edge remains in condition to resist skidding throughout the life of the link. The commonest and most dangerous skidding is that caused by application of the brakes when the wheel is on a slippery road or ground surface. Even a very slight braking is sometimes enough to cause skidding under such circumstances. When a wheel equipped with my improved cross chain is restrained by the brake or otherwise to the degree that the wheel tends to slip rather than roll, whatever may be the character or condition of the ground, the cross chain or chains between the tread surface of the wheel and the ground is rocked about the contact of the rib $g$ with the ground surface, aided by the connecting links which are rocked in the same manner as before described but in the opposite direction, somewhat as shown in Fig. 4, until the edge $m$ comes in contact with the ground; and as this edge is always sharp, it is in good condition to cut into the road surface and strongly resist skidding, assisted by the sharp edge or apex of the rib, even though the surface is hard ice or a smooth wet pavement. In Fig. 4 the arrow represents the direction in which the wheel tends to skid when so restrained and shows in principle how the skid resisting link is rocked at such times. In Fig. 3, on the other hand, the arrow represents the direction of normal rotation of the wheel and shows how the skid resisting link makes contact with the ground as it is carried around by the wheel. It will be apparent that this type of link has much greater holding power than those of the ordinary cross chains, or than spurs or pins or studs applied to wheels and tire chains, all of which wear smooth and flat in use and quickly lose whatever power they may originally have had to cut into a hard smooth road surface.

The anti-skid link which comes at the middle of the tread is worn away substantially uniformly from end to end. When there are additional anti-skid links at either side of a central one, the wear on the lateral links is confined to a greater or less extent to the ends nearer to the center of the tread; but their action and the effect of wear upon them where they make contact with the ground is essentially the same as before described.

The connecting links at both ends of the skid resisting link or links are preferably made narrow enough so that they do not project beyond the rib of the adjacent skid resisting link and preferably project slightly less than such rib. The fact that they are placed edgewise to the tire and that both are connected in the middle line of the skid-resisting link facilitates the rocking of the latter as previously described. The skid resisting links may also be made somewhat wider in transverse dimension than the connecting links (although not enough so as to impair their capacity for rocking) in order to extend the edges $m$ and $n$ farther outward and give a greater wearing surface to the plate and thereby increase the useful length of life over what would be the life if made as narrow as the connecting links. For the same purpose, the rib may be made relatively wider than as shown, or of rectangular or other section instead of V-shaped in section. Obviously the stock in the ribbed plate welded, and thus integrally joined, to the base link procures a length of useful life many times greater than that of a plain link in the location of the skid resisting link.

Not only does the use of my improved skid resisting link obtain the advantages above mentioned, but it also enables plain links to be used for both the bases of the skid resisting links and the connecting links. That is, it avoids the necessity of twisting the links to form the curb-chain type of links heretofore found necessary for the usual tire cross chains. Twisting in an additional operation to those of bending and welding the wire to form links and is a cause of expense which I have eliminated.

I have also devised further economies, as illustrated in Figs. 7-12, consisting in making the links, both the skid resisting and connecting links, in forms which make unnecessary the difficult and expensive step of butt welding the ends of the pieces out of which the links are formed. Thus in Figs. 7 and 8, the wires forming both the connecting links and the bases of the skid resisting links are curled over until the ends $o$ and $p$ meet the back or opposite side member $q'$ of the link, in each case. The member $q'$ may be straight or may be curved inward, as shown. In the case of the skid resisting links, the plate $f$, being welded to the base so formed, ties the ends and intermediate side of the wire together, making any other welding operation unnecessary. In the case of the connecting links, if the stock is not stiff enough to hold the shape thus given to the wire under the conditions of service, the extremities $o$ and $p$ may be welded to the back $q'$ by a single spot welding operation, which is more easily and cheaply performed than the butt welding of the two ends of the link forming wire.

Figs. 9 and 10 illustrate a modification of the same idea in which the ends of the wire forming the base of the skid resisting link are made long enough to pass one another and are offset so as to lie in part side by side in the same plane with the back of the link, and all three lengths of the wire are then welded to the plate $f$.

In Figs. 11 and 12 a modified form of connecting link $d^2$ is shown, in which the ends $o^2$ and $p^2$ are extended and offset in a helical manner to lie side by side in a different plane to that of the back of the link. These overlapping ends may be united by spot welding.

All the new features and principles of this skid resisting link and cross chain may be embodied in chains and link structures adapted to be secured to a wheel in other ways than by connection with longitudinal side chains.

In describing the links of this chain as being made of wire I have not intended to limit the materials which may be used in their construction. That is, the term "wire" as here used is intended to include wire and analogous stock of any material and gauge suitable for the purpose, regardless of the processes by which such stock is made or its shape in cross section. Any stock is considered as wire within the meaning of this definition which has such ratio of length to thickness and such ductility as to be capable of being bent into links of the form and character herein disclosed. I do not intend this term to be construed with a narrow significance so as to exclude, for instance, stock which might, under some standards of classification, be considered as rod or bar stock. It is not necessary, however, that all the links be made of wire, but some of them, including those having the skid resisting properties described, may be made as punchings or stampings from sheet metal or drop forgings, with an integral closed outline; the links which are coupled to such stamped links being made of the wire construction described. Where stampings or forgings in forms similar to the so-called link proper first described are used as the bases for skid resisting links, the ribbed plates are welded to them in exactly the same manner as previously described.

What I claim and desire to secure by Letters Patent is:

1. An anti-skid cross chain for vehicle wheels comprising interconnected links, one of which has a base portion of greater length than width with an eye centrally located at each end receiving an adjacent link, and with a longitudinal rib projecting from the side which is outermost when applied to a wheel; the formation of the said link and its single point connection with the adjacent link at each end causing it to rock on its rib when the wheel slides forwardly over the ground.

2. An anti-skid cross chain for vehicle wheels comprising links interconnected end to end, one of said links between two adjacent links being an anti-skid link having a single eye at each end of merely sufficient width to receive the interconnected eye of the adjacent link freely, and being of substantially uniform width throughout its length; the said anti-skid link having a greater thickness in its middle portion than at the ends, such middle portion protruding beyond the plane in which the eyes are located and having a longitudinal rib protruding further in the same direction.

3. In a cross chain for automobile tires, an anti-skid link having opposite side edges and a rib on its outer face intermediate said edges extending longitudinally of the link, and a single eye at each end in a plane substantially parallel to said edges, combined with connecting links, one at each end of the anti-skid link, in a plane perpendicular to the before named plane passing through said eyes and arranged to extend from the anti-skid link toward the tire tread and provide unstable abutments adapted to rock when the tire passes over them and thereby to incline the anti-skid link and cause its contact with the ground and its wear to be limited to the portions at one side of the rib.

4. An anti-skid cross chain for vehicle wheels comprising a series of links interconnected in line; that link thereof which is arranged to come adjacent to the most protuberant part of the wheel tread, when the chain is applied to a wheel, being an anti-skid link having a single centrally located eye at each end, a central longitudinal rib projecting from its outer face, and lateral web portions at either side of said rib; said anti-skid link being connected by means of its said eyes in a single line of draft with the adjacent links, and the chain having portions projecting away from the back or inner plane of said webs, oppositely to said rib, and adapted to make rockable contact with the wheel tread while the rib makes rockable contact with the ground.

In testimony whereof I have affixed my signature.

PRESTON M. HALL.